(12) United States Patent
Gates et al.

(10) Patent No.: US 6,588,637 B2
(45) Date of Patent: Jul. 8, 2003

(54) HOLDING DEVICE WITH ALTERNATING LENGTH GRIPPING FINS

(75) Inventors: George D. Gates, So. Jordan, UT (US); Travis D. Gates, Riverton, UT (US)

(73) Assignee: All Rite Products, Inc., West Jordan, UT (US)

( * ) Notice: Subject to any disclaimer, the term of this patent is extended or adjusted under 35 U.S.C. 154(b) by 85 days.

(21) Appl. No.: 09/941,511

(22) Filed: Aug. 28, 2001

(65) Prior Publication Data

US 2003/0042282 A1 Mar. 6, 2003

(51) Int. Cl.[7] .................................................. B60R 7/00
(52) U.S. Cl. ...................... 224/546; 224/401; 224/420; 224/446; 224/448; 224/450; 224/547; 224/552; 224/558; 224/560; 224/913; 42/96; 211/64; 248/222.12; D3/262
(58) Field of Search ................... 224/401, 410, 224/413, 420, 445, 446, 448, 450, 546, 547, 550, 552, 555, 558, 560, 913, 916; 42/94, 96; 211/64, 89.01; 248/205.1, 222.12; D3/262; D12/406; D22/108

(56) References Cited

U.S. PATENT DOCUMENTS

| 3,931,893 | A | | 1/1976 | Elkins et al. |
|---|---|---|---|---|
| 4,450,989 | A | | 5/1984 | Rogar, Jr. |
| 4,607,772 | A | | 8/1986 | Hancock |
| 5,078,279 | A | | 1/1992 | Hancock et al. |
| 5,344,032 | A | | 9/1994 | Ramsdell |
| 5,524,772 | A | * | 6/1996 | Simmons ...................... 211/4 |
| D386,298 | S | | 11/1997 | Hancock |
| D386,304 | S | | 11/1997 | Hancock |
| 5,915,572 | A | | 6/1999 | Hancock |
| 6,484,913 | B1 | * | 11/2002 | Hancock et al. ............ 224/401 |

* cited by examiner

Primary Examiner—Stephen K. Cronin
(74) Attorney, Agent, or Firm—Thorpe North & Western

(57) ABSTRACT

A utility holding device configured to be attached to a utility structure and to carry elongated objects includes a support base, a mounting stem supported by the support base, and a generally U-shaped holding member supported by the mounting stem. The U-shaped member has two upright arms which are open at the top so as to define a containment area configured to receive an elongate object. The U-shaped member further includes a plurality of alternating length gripping fins extending from at least one of the upright arms into the containment area to help hold items securely therein.

22 Claims, 2 Drawing Sheets

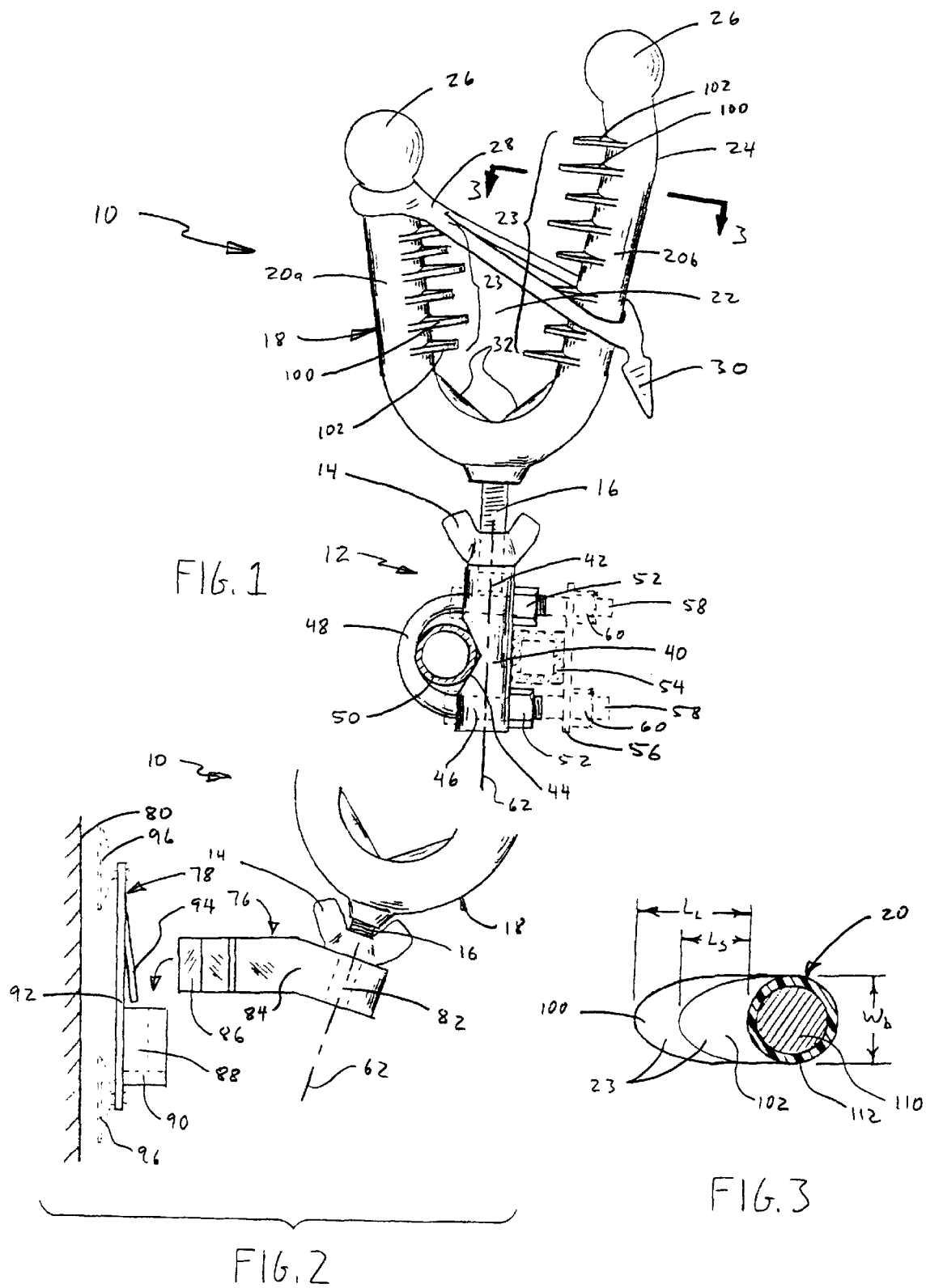

HOLDING DEVICE WITH ALTERNATING LENGTH GRIPPING FINS

BACKGROUND OF THE INVENTION

1. Field of the Invention

The present invention relates generally to holding devices. More particularly, the present invention relates to a holding device with alternating length gripping fins for holding an object disposed in the holding device.

2. Related Art

There are many carrying devices which attach to cars, trucks, ATV's, or other structures, for holding elongate objects. These range from simple gun racks, to more elaborate holding systems. U.S. Pat. Nos. 4,607,772 and 5,078,279 disclose utility carrying devices for carrying guns, fishing poles, and the like, which are mountable to the handlebars, cargo rack, frame, or other parts of a car, truck, motorcycle, or ATV, or to a wall, window, etc. There are also carrier devices which include inwardly directed flexible fingers. U.S. Pat. Nos. Des. 386,298 and Des. 386,304 disclose holders with such fingers, as does the '772 patent mentioned above.

In prior art holders with fingers, the fingers tend to be either of a uniform length, or of a gradually varying length, such as gradually becoming longer toward the bottom of the holding member. The fingers help prevent objects disposed in the holder from jarring free, such as due to vibrations or bumps encountered by a vehicle upon which the holder is mounted. However, where the fingers are substantially uniform in length or gradually vary in length, they can provide too much grip upon an inserted object in some circumstances, and also make undesirable noise when an object is removed therefrom.

SUMMARY OF THE INVENTION

It has been recognized that it would be advantageous to develop an object holder with gripping fins configured to grip less tightly than previously known configurations.

It would also be advantageous to develop an object holder with gripping fins which cause less noise when an object is removed from the holder.

The present invention advantageously provides a utility holding device configured to be attached to a utility structure and to carry elongated objects, which includes a support base, a mounting stem supported by the support base, and a generally U-shaped holding member supported by the mounting stem. The U-shaped member has two upright arms which are open at the top so as to define a containment area configured to receive an elongate object. The U-shaped member further includes a plurality of alternating length gripping fins extending from at least one of the upright arms into the containment area to help hold items securely therein.

In accordance with a more detailed aspect of the present invention, the support base may be disposed substantially below the U-shaped member, or substantially to the side of the U-shaped member.

In accordance with another more detailed aspect of the present invention, the U-shaped member is pivotable with respect to the support base, such that the holding member may be rotated to more securely grip elongate objects therein.

In accordance with yet another more detailed aspect of the present invention, one of the upright arms of the U-shaped member extends higher than the other, and includes an elbow which bends toward the containment area.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1 is a side view of one embodiment of a holder with alternating length gripping fins in accordance with the present invention, disposed upon a support base substantially below the holder.

FIG. 2 is a partial side view of an alternative embodiment of the holder of FIG. 1 disposed upon a support base which is substantially to the side of the holder.

FIG. 3 is a cross-sectional view taken through one of the upright members of the holder, looking down at a long and a short gripping fin.

DETAILED DESCRIPTION

Figure 4:
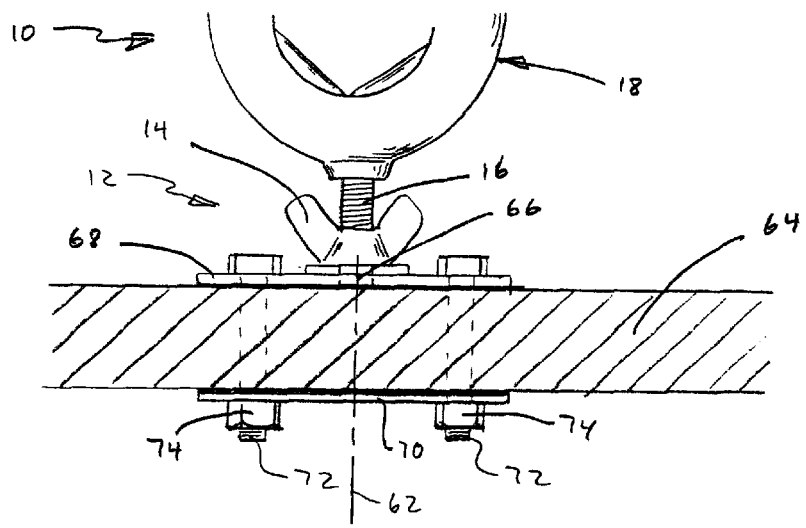
FIG. 4 is a partial cross-sectional view of the holder of FIG. 1 mounted upon a flat panel.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

A utility holding device 10 constructed in accordance with the present invention is shown generally in FIG. 1, and provides a carrier which is attachable to a support structure such as a cargo rack of an ATV or other vehicle. The holding device generally comprises a support base 12, a lock nut 14, a mounting stem 16, and a U-shaped holding member 18 atop the mounting stem.

The holding member 18 is designed to receive and carry a variety of elongated objects (not shown), such as a rifle, tools, sports equipment, etc. The holding member is a generally U-shaped member having two upright arms 20a, b, which is open at the top so as to define a containment area 22 configured to receive the elongate object. Flexible, resilient gripping fins 23 extend into the containment area from one or both of the upright arms 20, to provide additional gripping force on the object, as described in more detail below. One upright arm 20b is longer than the other, and includes an elbow 24 near its top, which helps provide a downward force upon the object when the holder is rotated. The holding member may also include flexible rubber balls 26 atop the upright arms to help hold objects in the rack. It will be apparent that various shapes and methods of attachment of such rubber balls can be employed.

The holding member 18 may be provided with a hold-down member 28 for securing objects in the containment area 22. One end of the hold down member is attached to one upright arm 20 below the ball 26. With an object in the containment area, the opposing end of the hold-down member may be stretched over the object, and looped or tied around the other upright arm 20 below its ball 26. In this way, a secure grip may be provided for varied sizes of objects.

Suitable hold-down members may include rope, string, or other such devices adaptable for securing or tying an object within the holding member. The hold-down member depicted in FIG. 1 is a loop of elastic material, called a snubber, and includes a tab 30 on one end which facilitates grasping by a user, and allows the hold-down member to be quickly and easily attached or removed from the holder.

In one embodiment, the holding member 18 further includes opposingly inclined resilient surfaces 32 disposed in the bottom of the containment area of the U-shaped member, for gripping objects placed therein. This design provides a tapering structure with internal angles to form fit and hold items of different diameters or sizes, and causes a contained object to nest in a secure position toward the base of the U. The opposingly inclined resilient surfaces are preferably formed of rubber material to securely grip the object. These surfaces also facilitate locking the object in place when the holder is rotated.

The support base 12 shown in FIG. 1 is configured to be attached to a bar of a cargo rack or other utility structure. Such utility structures may include a cargo rack of an ATV or other vehicle, a treestand railing, a treestand footrest, vehicle handlebars, a kickboat frame, etc. In the embodiment shown in FIG. 1, the support base comprises a generally vertical body 40 with a substantially vertical threaded aperture 42 in the top end, a notch 44 in one side, and bolt holes 46 passing transversely through the body above and below the notch. The threaded mounting stem 16 of the holder is threadedly insertable into the vertical aperture, and the wing-type locking nut 14 is disposed on the mounting stem.

This configuration allows a user to adjust the height and angular orientation of the holder by rotating the holder about a long axis 62 of the mounting stem 16, to screw the mounting stem into or out of the vertical aperture, then locking it in place by tightening the wing nut 14. It will be apparent that elevational adjustment of the holding member is best accomplished without an object in the holder. Then, pivoting of the holder with an elongate object therein reduces the aspect of the containment area relative to the long dimension of the object, so as to grip it more securely. The pivoting feature thus allows for twist adjustment and locking, and allows the holder to fit objects of various sizes, while still providing a firm grip.

The support base 12 may include a clamp means which allows it to be securely attached to the support structure. The clamp means may be configured in several ways. In one embodiment, a u-bolt 48 is used in combination with the notch 44 formed in the side of the body 40 of the base. The notch is placed against a support member, such as a round bar 50 (shown in cross-section in FIG. 1), and the u-bolt is then placed around the opposite side of the round bar with its threaded ends extended through the bolt holes 46 in the body. Nuts 52 are then tightened on the threaded ends of the u-bolt to clamp the body in place against the support bar. In this way the support base operates as both a support for the holder, as well as providing a clamp means.

In an alternative configuration, shown in dashed lines in FIG. 1, the body 40 of the support base can be attached to a rectangular or square bar 54, shown in cross-section. In this embodiment, the side of the body opposite the notch 44 is placed against one side of the square bar 54, and a locking plate 56 is disposed against an opposite face of the square bar. Instead of a u-bolt, a pair of straight bolts 58 are extended through the locking plate and the bolt holes 46, and secured with nuts 60 to clamp the base in place.

The square bar embodiment provides an advantage in that, when secured in place, the orientation of the support base is mechanically locked by virtue of the square shape of the bar, and the base cannot be rotated around the bar in the plane of the drawing. With the round bar embodiment, in contrast, the forces which prevent rotation are primarily frictional, and with sufficient force the base could possibly be rotated about the axis of the round bar, in the plane of the drawing.

Viewing FIG. 4, the clamp means may be alternatively configured to attach the support base 12 to a flat panel 64. In this embodiment, the mounting stem 16 is threadedly insertable into a threaded aperture 66 of a top plate 68, and the wing nut 14 is disposed thereon for locking the holder in place. A bottom plate 70 is disposed on the opposite side of the panel from the top plate, and bolts 72 are extended through the panel and provided with nuts 74 to clamp the top and bottom plates to the opposing sides of the panel.

It will be apparent that the support base 12 may be configured in other ways, as well. For example, referring to FIG. 2, an alternative support base extends substantially to the side of the holding member, relative to the long axis 62 of the mounting stem 16. In this embodiment, the support base includes a base body 76 which is removably attachable to a base bracket 78 configured for attachment to a substantially vertical surface 80. The base body includes a threaded aperture 82 for receiving the mounting stem 16, and the wing nut 14 for locking the holder in place. In the embodiment shown in FIG. 2, the base body includes an angular offset, denoted generally at 84, designed to orient the holder 18 away from the vertical surface in order to provide clearance for rotating the holder.

The base body 76 extends substantially to the side relative to the holder 18 and mounting stem 16, and has a dovetail end 86 configured to slide into a correspondingly shaped vertical channel 88, having a bottom 90, formed in the base bracket 78. The base bracket includes a back plate 92 with locking tab 94 which is configured to resiliently extend forwardly from the back plate to lock the dovetail end of the base body into the vertical channel when placed therein. To remove the base body from the bracket, a user simply presses the locking tab toward the back plate of the bracket, while lifting upward on the base body 76 to slide it up and out of the vertical channel 88. In this way, the holder is easily removable from the support base.

The base bracket 78 is configured to be attached to a wall or other substantially vertical surface 80. Attachment may be by means of suction cups 96, bolts (not shown), screws (not shown) adhesive applied to the back plate (not shown), or other attachment methods readily apparent to one skilled in the art. It will be apparent that the attachment method may depend upon the nature of the surface, whether glass, steel, wood, etc.

While a single holding device 10 as depicted in FIG. 1 may be used for some types of objects, or may be used in combination with some other support device for holding an elongate object, it will be apparent that a utility holding system comprising a plurality of holding devices (usually two) is preferable. The two or more holding devices are attached to a cargo rack or other support structure, and disposed with their holding members 18 in alignment such that an elongate object may be supported by the two or more holders. To help secure the elongate object in the holders, each holder may be rotated to effectively close or reduce the aspect of the containment area 22 relative to the long dimension of the elongate object.

The shape and configuration of the gripping fins 23 is an advantageous aspect of the present invention. Viewing FIG.

3, the size and shape of the gripping fins are shown relative to each other and relative to the cross-sectional shape of an upright arm 20. While the gripping fins are shown having a generally elliptical shape at their distal end, it will be apparent that many other shapes may be used, including rounded, square, etc.

The gripping fins 23 are thin and flexible, yet resilient, and deflect downward when an object is pressed down into the containment area 22. By resiliently deflecting against the object, the gripping fins provide extra grip on the object. However, where gripping fins are substantially uniform in length or gradually vary in length, as in the prior art, they can provide too much grip upon an inserted object in some circumstances, because adjacent fins tend to bind with each other. They can also make undesirable noise when an object is removed therefrom because of the sudden release of frictional forces between adjacent fins. This can be a significant problem for hunters, for example, when removing a weapon from the holder, because it may alert an approaching animal to the hunter's presence.

Advantageously, the present invention provides gripping fins 23 with alternating lengths to reduce the extra holding force which they provide, and to reduce noise created when objects are removed therefrom. As depicted in FIG. 1 and FIG. 3, the gripping fins include long fins 100 and short fins 102 alternatingly disposed in a series—i.e., short-long-short-long, etc. Because adjacent fins have different lengths, there is less surface area of any one fin which contacts an adjacent fin when deflected, and hence less friction between the fins. The reduces binding of the fins, and thus reduces the force which they impose upon an object disposed in the holder.

The gripping fins 23 have a base width $W_b$, which is approximately the same as the outer diameter of the upright arm 20. The long gripping fin has a length $L_L$, and the short gripping fin has a length $L_s$. In the embodiment shown in FIG. 3, $W_b$ is less than $L_s$. The inventors have found that this ratio of length to width provides excellent operational characteristics. It will be apparent, however, that gripping fins with different geometrical configurations may be used in accordance with the present invention.

Figures 5A, 5B, 5C:
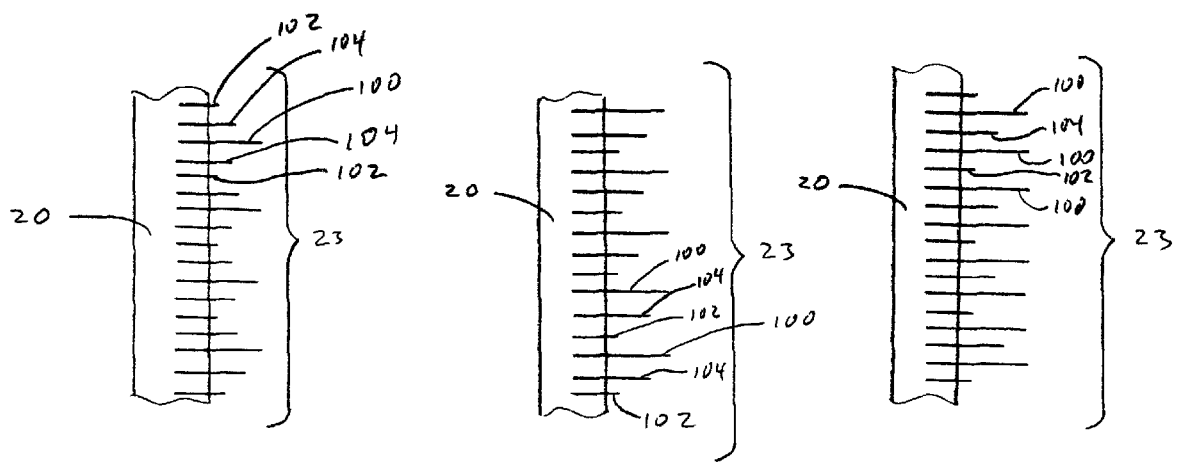
FIGS. 5A–5C are broken out views of portions of an upright arm showing alternative gripping fin arrangements.

It will also be apparent that various configurations of alternating length fins may be provided, in addition to just the long-short-long-short configuration. For example, the fins may alternate in pairs or sets, such as long-short-short-long-short-short (not shown), or long-long-short-short-long-long-short-short (not shown), etc. Other combinations may be devised. Additionally, viewing FIGS. 5A–5C, more than two different lengths of fins may be provided, and these may be alternated in various ways. The fins may include medium length fins 104, and may alternate short-medium-long-medium-short-medium-long, as shown in FIG. 5A. Alternatively, the fins may alternate long-medium-short-long-medium-short, etc., as shown in FIG. 5B. As yet another alternative, the fins may alternate long-short-long-medium-long-short-long-medium, etc., as shown in FIG. 5C. It will be apparent that other combinations are also possible.

The holding device 10 in its entirety, or any of its constituent parts, may be constructed of numerous materials including metals and plastics. Specific selection of materials will depend on the characteristics of weight, strength and function desired. Referring to FIG. 3, the holding member 18 and mounting stem 16 are preferably formed of a stainless steel core 110, which is provided with a thick coating 112 of resilient Sanoprene rubber material. This rubber material provides excellent gripping and wear characteristics. The rubber coating may be injection molded directly onto the core steel of the holding member, and the balls 26 and gripping fins 23 integrally formed as part of the rubber coating. The base body 40, 76, nuts and bolts, plates 56, 68, 70, and base bracket 78 may also be formed of numerous materials, including metals and plastics. However, metals are preferred for many of these parts for reasons of strength and rigidity.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A utility holding device, comprising:
   a support base configured to be attached to a utility structure;
   a generally U-shaped holding member supported by the support base, the U-shaped member having two upright arms and being open at the top so as to define a containment area configured to receive an elongate object; and
   a plurality of flexible, resilient, alternating length gripping fins extending from at least one of the upright arms into the containment area, and configured to deflect downward against the elongate object when the object is placed in the containment area.

2. The utility holding device according to claim 1, wherein the alternating length gripping fins include long and short fins.

3. The utility holding device according to claim 2, wherein the long and short fins alternate in a repeated long-short series.

4. The utility holding device according to claim 2, wherein the alternating length gripping fins further include medium length fins, and the fins alternate in a repeating series selected from the group consisting of: short-medium-long-medium; long-medium-short; and long-short-long-medium.

5. The utility holding device according to claim 2, wherein the gripping fins have a base width and a length, and the length of a short fin is greater than the base width.

6. The utility holding device according to claim 5, wherein the base width is about equal to an outer diameter of the upright arm.

7. The utility holding device according to claim 2, wherein the alternating length gripping fins further include distal ends which are substantially elliptically shaped.

8. The utility holding device according to claim 1, wherein the holding member includes opposingly inclined resilient surfaces disposed in a lower portion of the containment area of the U-shaped member, for gripping objects placed therein.

9. The utility holding device according to claim 1, wherein one of the upright arms extends higher than the other, and includes an elbow which bends toward the containment area.

10. The utility holding device according to claim 1, wherein the U-shaped member is pivotable with respect to the support base, such that the holding member may be rotated to more securely grip elongate objects therein.

11. A utility holding system configured to carry elongated objects, comprising:

a support structure;

a utility holder attached to the support structure, including:

(1) a support base connected to the support structure;

(2) a generally U-shaped holding member connected to the support base, and configured to receive an elongate object therein, the U-shaped member having two upright arms and being open at the top so as to define a containment area configured to receive an elongate object;

(3) a plurality of gripping fins extending from at least one of the upright arms into the containment area, configured to deflect downward when an object is pressed down into the containment area to provide extra grip on the object, the plurality of gripping fins being arranged to alternate between longer and shorter fins.

12. The utility holding system according to claim 11, wherein the gripping fins include long and short fins which alternate in a repeated long-short series.

13. The utility holding system according to claim 11, wherein the alternating length gripping fins include long, medium, and short fins, and the fins alternate in a repeating series selected from the group consisting of: short-medium-long-medium; long-medium-short; and long-short-long-medium.

14. The utility holding system according to claim 11, wherein the gripping fins have a base width and a length, and the length of a short fin is greater than the base width thereof.

15. The utility holding system according to claim 11, wherein the alternating length gripping fins further include distal ends which are substantially elliptically shaped.

16. The utility holding system according to claim 11, wherein the holding member comprises a generally U-shaped containment area having two upright arms and being open at the top.

17. The utility holding system according to claim 16, wherein the holding member further comprises opposingly inclined resilient surfaces disposed in the containment area of the U-shaped member, for gripping objects placed therein.

18. The utility holding system according to claim 11, further comprising:

a threaded mounting stem, fixedly connected to the holding member and pivotally threadedly connected to the support base, configured such that the holding member may be pivoted about a long axis of the mounting stem to selectively (i) adjust the height of the holding member relative to the support base, and (ii) more securely grip elongate objects in the holding member; and a locking nut for locking the holding member in position relative to the support base.

19. The utility holding system according to claim 18, wherein the support base further comprises:

a base member having a mating surface; and at least one bolt attached to the base member, configured to be tightened to grip a bar of the cargo rack, to secure the base member thereto.

20. The utility holding system according to claim 18, wherein the support base further comprises:

a top plate configured to be disposed on a top surface of a flat panel, having a threaded aperture for receiving the mounting stem;

a bottom plate configured to be disposed on a bottom surface of the flat panel opposite the top plate; and a bolt extending through the top plate, the panel, and the bottom plate, to clamp the top and bottom plates to the opposing sides of the panel.

21. The utility holding system according to claim 18, wherein the support base further comprises:

a base body extending substantially perpendicular to a long axis of the mounting stem, and having a dovetail at one end, and a downwardly angled portion in which the mounting stem is threadedly received at another end; and a base bracket configured to attach to a substantially vertical surface, having a slot configured to receive the dovetail, whereby the base body may be inserted into the base bracket and extend outwardly from the substantially vertical surface.

22. A utility holding device configured to be attached to a utility structure and to carry elongated objects, comprising:

a support base configured to be attached to a utility structure;

a generally U-shaped holding member pivotally supported by the support base, the U-shaped member including:

(1) two upright arms and being open at the top so as to define a containment area configured to receive an elongate object, one of the upright arms extending higher than the other and having an elbow which bends toward the containment area; and (2) a threaded mounting stem, pivotally threadedly connected to the support base, configured such that the holding member may be pivoted about a long axis of the mounting stem to selectively (i) adjust the height of the holding member relative to the support base, and (ii) more securely grip elongate objects in the holding member; and (3) a plurality of flexible, resilient, alternating length gripping fins extending from each of the upright arms into the containment area, and configured to deflect downward when an object is placed in the containment area;

a locking nut for locking the holding member in position relative to the support base; and a hold-down member attached to the upright arms, and configured to be disposed over the object to hold the object in the holding member.

* * * * *